United States Patent Office 2,818,041
Patented Dec. 31, 1957

2,818,041

CORED SOLDER

Ralph Chill, Mentor, and Tien-Shih Liu, Cleveland, Ohio, assignors to Horizons Incorporated, Princeton, N. J., a corporation of New Jersey No Drawing. Application August 16, 1956
Serial No. 604,312

4 Claims. (Cl. 113—110)

This invention relates to the joining of aluminum to other metals by soldering. More particularly, it relates to a cored solder for joining members formed of aluminum or aluminum-base alloys to one another or to members formed of other non-ferrous or ferrous metals or alloys.

Efforts to fabricate metal structures including members of aluminum or aluminum base alloys, have been hampered by a phenomenon which is characteristic of all metallic materials which are primarily aluminum, namely the formation of a thin and almost invisible coating of oxide on the outer surface of the metal member as a result of exposure to the ordinary atmosphere or to any oxidizing environment. One of the more common methods of removing this oxide involves the use of salts which flux, dissolve or react with the oxide or which in any other way effect the removal of the oxide. Many of the compositions which have been developed in the past are based on the halide salts of one or more of the following: the alkali metals, the alkaline earth metals, the metals of groups Ib, IIb, or IIIb of the periodic table or ammonium.

Thus mixtures based on either ammonium chloride or zinc chloride are common in the prior art. Such compositions are hygroscopic and tend to pick up moisture from the atmosphere and when heated, as in welding, brazing, or soldering, the moisture tends to reoxidize the metals being joined, and to form oxyhalides which are corrosive toward the metals joined and which are difficult to remove from the region of the joint by simple washing. For this reason it is not uncommon to encase such fluxing compositions in an envelope which prevents access of moisture from the surrounding atmosphere. Such envelopes may be formed of cardboard, paper or resinous materials, or even metals. To realize the optimum benefits of such an outer covering, it is desirable to form it of a composition which is useful in joining the base metals, such as a solder. By suitably controlling the relative proportions of cover and contents any desired ratio of solder:flux may be achieved so that they are supplied to the joining operation in properly metered amounts.

In accordance with our invention, the solder we prefer is one composed of zinc with a limited amount of silver, and the soldering flux we prefer is one which is active at temperatures very slightly below the melting point of the solder. In this way the application of heat to the cored solder does not produce a molten pool of flux which may be flashed off in the form of fumes or which may be oxidized to form a scum or crust long before the solder melts and is ready to join the metals. In addition, we have found that a soldering flux composition which contains only chlorides, as for example the fluxes described in United States Patent 2,723,929, in which flux composition the aluminum chloride is relied on to remove the oxide from the aluminum base members, or the compositions described in copending applications Serial Numbers 604,318, 604,322 and 604,336, filed of even date herewith, based on zinc chloride and containing a mixture of three alkali metal chlorides, may be used to advantage, particularly when such compositions contain substantial amounts of one or more metal chlorides which are decomposed by aluminum at elevated temperatures.

In the composite of our invention the proportions of zinc and silver are somewhat critical and should not be appreciably varied from the 98%–2% ratio found to give excellent results. Alloys with silver in amounts between 0.1% and 3%, balance zinc or in amounts between 0.1% and 3% with about 0.3–0.5% Al, balance zinc, have been found almost as satisfactory as the 98% Zn–2% Ag alloy, preferred by us.

A cored solder was produced by preparing a flux composed of alkali metal chlorides and zinc chloride in the following proportions:

NaCl—between 5 and 25 mol percent or between 6 and 29 weight percent
KCl—between 15 and 40 mol percent or between 21 and 43 weight percent
LiCl—between 40 and 75 mol percent or between 29 and 66 weight percent and $ZnCl_2$ 9 parts by weight for each 10 parts of the total mixture by weight.

The mixture, after intimately blending the components, was introduced into a ½ inch diameter rod composed of an alloy of zinc (98%) and silver (2%). The composite was extruded through a die to produce a compact ¼ inch in diameter. Coextrusion of the flux and sheath was accomplished without any difficulty. It was found that in the resulting package the flux did not attack the sheath material appreciably even when stored for extended periods of time.

The cored solder of our invention may be prepared with other flux materials. Thus, as previously indicated, a flux containing $AlCl_3$, LiCl, NaCl and KCl in which the molar proportion of $AlCl_3$ lies between 52% and 82%, described in U. S. Patent 2,723,929, was introduced into a tube formed of zinc alloyed with 2% by weight of silver. The resulting composite was extruded to around one-fourth the area of the original tube.

Both cored solders produced as above had excellent shelf life and were found to produce strong joints with ample fillets when fabricating aluminum structures, such as storm windows and storm doors.

The ratio of solder to flux may be varied between 0.8:1 up to 2.5:1 when employing the zinc base silver-containing solder alloys of this invention, with all chloride fluxes such as those previously disclosed. It should be noted that the melting point of the hard solder employed in the combination is about 700° F., which is approximately 200° F. higher than the melting point of many of the chloride fluxes forming the core of our composite. These fluxes become molten at temperatures below 500° F. and also become reactive at temperatures approximating the melting point of the solder material. For this reason both the flux and solder are fully efficient at the soldering temperatures, which lie between 725 and 775° F.

We claim:

1. A solder alloy consisting essentially of between 0.1 and 3% by weight of silver, 0.3–0.5% by weight of aluminum, balance zinc.

2. A cored solder consisting of a sheath of a zinc base alloy consisting essentially of between 0.1% and 3% by weight of silver, up to 0.5% by weight of aluminum, balance essentially zinc and a core of a metal chloride composition encased in said sheath, said core consisting essentially of about nine parts by weight of zinc chloride for each one part by weight of a low melting mixture of alkali metal chlorides in which the sodium chloride constitutes between 6% and 29% by weight, the potassium chloride constitutes between 21% and 43% by weight and the lithium chloride content is between 29% and 66% by weight.

3. The cored solder of claim 2 in which the ratio of the weight of the sheath to the weight of the core is between 0.8:1 and 2.5:1.

4. A cored solder consisting essentially of a sheath composed of a zinc base alloy of between 0.1 and 3% by weight of silver, and up to 0.5% by weight of aluminum, balance zinc, and the core consisting essentially of a low melting eutectic mixture of lithium chloride, sodium chloride and potassium chloride and at least one chloride from the group consisting of aluminum chloride and zinc chloride, in which said aluminum chloride and zinc chloride constitute a predominant portion of the chloride mixture.

References Cited in the file of this patent

UNITED STATES PATENTS

| | | |
|---|---|---|
| 2,616,384 | McBride | Nov. 4, 1952 |
| 2,781,577 | Smellie | Feb. 19, 1957 |